(12) United States Patent
Courtney et al.

(10) Patent No.: US 12,454,090 B2
(45) Date of Patent: Oct. 28, 2025

(54) METHOD AND APPARATUS FOR EXTRUDER BARREL AND SHAFT COOLING

(71) Applicant: CORNING INCORPORATED, Corning, NY (US)

(72) Inventors: Andrew Paul Courtney, Painted Post, NY (US); William Jay Hurlburt, Avoca, NY (US); Shawn Michael Huyler, Lawrenceville, PA (US); David Allan Leister, Hammondsport, NY (US); Patrick Ronald Shane, Jim Thorpe, PA (US); Conor James Walsh, Campbell, NY (US)

(73) Assignee: CORNING INCORPORATED, Corning, NY (US)

( * ) Notice: Subject to any disclaimer, the term of this patent is extended or adjusted under 35 U.S.C. 154(b) by 554 days.

(21) Appl. No.: 17/939,211

(22) Filed: Sep. 7, 2022

(65) Prior Publication Data

US 2023/0081830 A1 Mar. 16, 2023

Related U.S. Application Data

(60) Provisional application No. 63/242,800, filed on Sep. 10, 2021.

(51) Int. Cl.
*B29C 48/85* (2019.01)
*B29C 48/80* (2019.01)
(Continued)

(52) U.S. Cl.
CPC ............ *B29C 48/834* (2019.02); *B29C 48/82* (2019.02); *B29C 48/85* (2019.02); *B29C 48/92* (2019.02);
(Continued)

(58) Field of Classification Search
CPC ....... B29C 48/82; B29C 48/834; B29C 48/85; B29C 48/92; B29C 2948/92209;
(Continued)

(56) References Cited

U.S. PATENT DOCUMENTS 3,866,669 A   2/1975   Gardiner
4,541,792 A * 9/1985   Zakic .................... B29C 48/832
                                                    425/379.1

(Continued)

*Primary Examiner* — Xiao S Zhao
*Assistant Examiner* — Joseph S Leyson
(74) *Attorney, Agent, or Firm* — Kevin M. Able

(57) ABSTRACT

A cooling apparatus for an extruder includes a supply line configured to receive bulk coolant from a supply circuit via an inlet. The supply line delivers supply coolant to the extruder along a flow path. A return line communicates expelled coolant from the extruder, and a circulation line connects the supply line to the return line. The circulation line supplies a recirculated portion of the expelled coolant to the supply line and mixes the bulk coolant with the recirculated portion of the expelled coolant forming the supply coolant. A bypass line connects the supply line to the return line, and a flow control valve connects one of the supply line and the return line to the bypass line. A proportion of the expelled coolant to the bulk coolant forming the supply coolant is adjusted by the flow control valve to control the temperature of the supply coolant.

20 Claims, 6 Drawing Sheets

(51) Int. Cl.
*B29C 48/82* (2019.01)
*B29C 48/92* (2019.01)

(52) U.S. Cl.
CPC ............... *B29C 2948/92704* (2019.02); *B29C 2948/92885* (2019.02); *B29C 2948/92895* (2019.02)

(58) Field of Classification Search
CPC .......... B29C 2948/92361; B29C 2948/92476; B29C 2948/926; B29C 2948/92704; B29C 2948/92885; B29C 2948/92895; B29C 2948/92971
See application file for complete search history.

(56) References Cited

U.S. PATENT DOCUMENTS

| | | | |
|---|---|---|---|
| 6,132,077 A | 10/2000 | Fogarty | |
| 7,771,635 B2 | 8/2010 | Boothe et al. | |
| 2021/0402669 A1* | 12/2021 | Christiano | .......... B29C 48/2522 |

* cited by examiner

METHOD AND APPARATUS FOR EXTRUDER BARREL AND SHAFT COOLING

CROSS REFERENCE TO RELATED APPLICATION

This application claims the benefit of priority under 35 U.S.C. § 119 of U.S. Provisional Application Ser. No. 63/242,800 filed on Sep. 10, 2021, the content of which is relied upon and incorporated herein by reference in its entirety.

FIELD OF THE DISCLOSURE

The present disclosure is in the field of extrusion systems and methods and, more particularly, relates to cooling systems and methods for extrusion manufacturing processes.

BACKGROUND

The process of forming a ceramic honeycomb and other ceramic-based articles may involve extruding a ceramic precursor batch or mixture (also referred to herein as "ceramic batch", "batch mixture", or "ceramic batch mixture") through a barrel and then through an extrusion die to form an extrudate. The extrudate is then processed (e.g., cut, dried, and fired) to form final articles of manufacture. The disclosure provides improved methods and systems to control the temperature of an extrusion manufacturing process.

SUMMARY OF THE DISCLOSURE

In some aspects, the disclosure provides for a cooling apparatus for an extrusion manufacturing system. The manufacturing system comprises multiple cooling circuits for at least one extruder. The cooling apparatus comprises a supply circuit in fluid connection with a coolant supply that distributes bulk coolant to each of the cooling circuits. The cooling circuits are in connection with the supply circuit via a first control device. The cooling circuits comprise an inlet that supplies the bulk coolant to a supply line, which delivers supply coolant to the at least one extruder. A return line communicates expelled coolant from the at least one extruder, and a circulation line connects the supply line to the return line. The circulation line supplies a recirculated portion of the expelled coolant to the supply line and mixes the bulk coolant with the recirculated portion forming the supply coolant.

In another aspect of the disclosure, a cooling apparatus for an extruder is disclosed. The extruder is configured for extruding structures from a ceramic forming mixture. The cooling apparatus comprises a supply line configured to receive bulk coolant from a supply circuit via an inlet. The supply line delivers supply coolant to the extruder along a flow path. A return line communicates expelled coolant from the extruder, and a circulation line connects the supply line to the return line. The circulation line supplies a recirculated portion of the expelled coolant to the supply line and mixes the bulk coolant with the recirculated portion of the expelled coolant forming the supply coolant. A bypass line connects the supply line to the return line, and a flow control valve connects one of the supply line and the return line to the bypass line. A proportion of the expelled coolant relative to the bulk coolant forming the supply coolant is adjusted by the flow control valve, thereby controlling the temperature of the supply coolant.

In yet another aspect of the disclosure, a temperature control method for an extrusion manufacturing system is disclosed. The temperature control method comprises receiving bulk coolant in a cooling circuit from a coolant supply. The coolant is communicated as supply coolant to an extruder and received as expelled coolant from the extruder. The temperature control method further comprises recirculating a recirculated portion of the expelled coolant and mixing the recirculated portion with the bulk coolant to form the supply coolant. A proportion of the expelled coolant to the bulk coolant that forms the supply coolant is adjusted by adjusting the volume of the recirculated portion of the expelled coolant. The supply temperature of the supply coolant is thereby controlled based on the proportion of the recirculated portion of the expelled coolant to the bulk coolant that forms the supply coolant.

These and other features, objects and advantages of the present invention will become apparent upon reading the following description thereof together with reference to the accompanying drawings.

DETAILED DESCRIPTION OF THE PREFERRED EMBODIMENT

Figure 1:
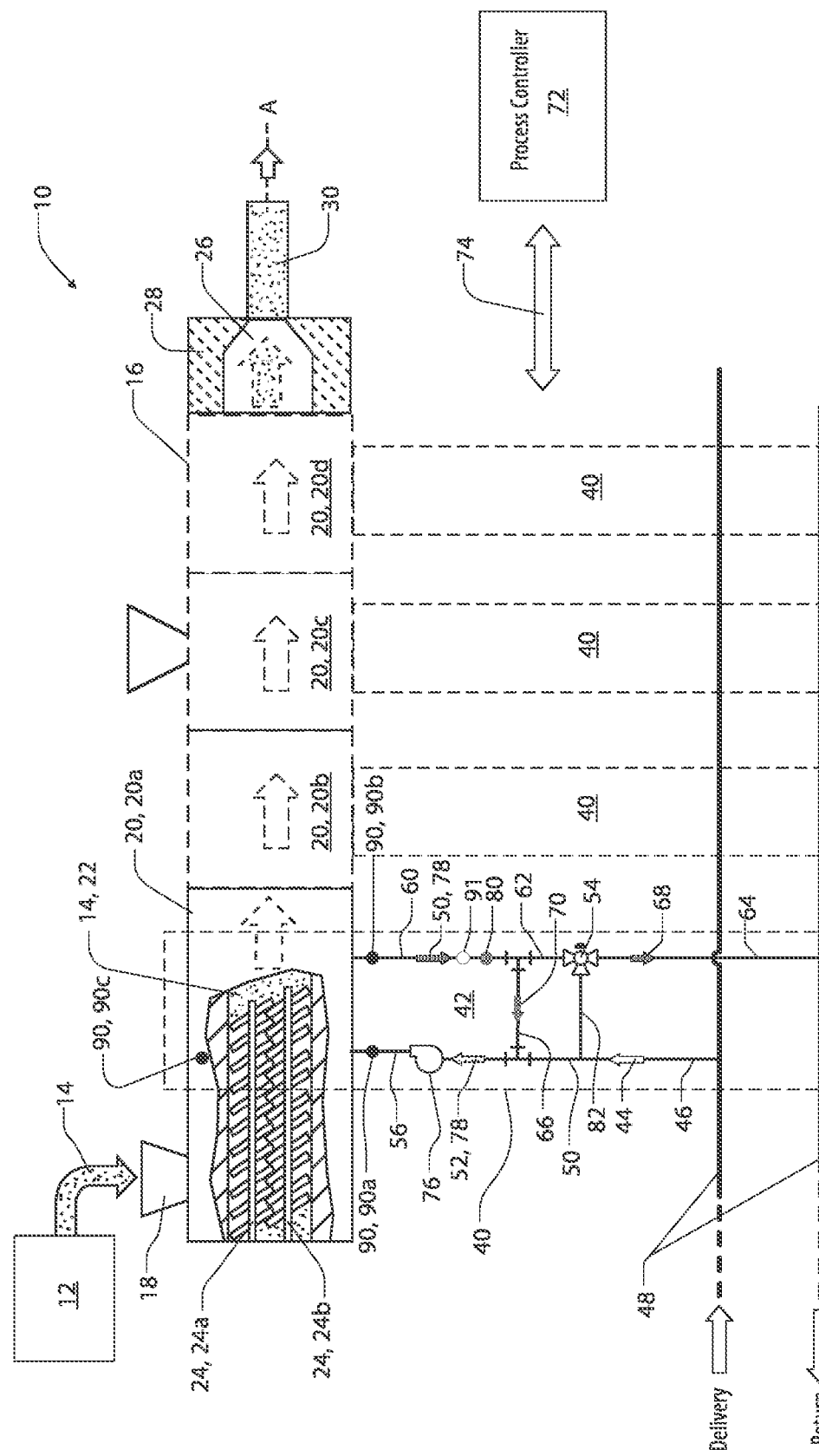
FIG. 1 is a schematic diagram of an example of an extrusion system comprising a cooling apparatus.

Additional features and advantages will be set forth in the detailed description which follows and will be apparent to those skilled in the art from the description, or recognized by practicing the embodiments as described in the following description, together with the claims and appended drawings. As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
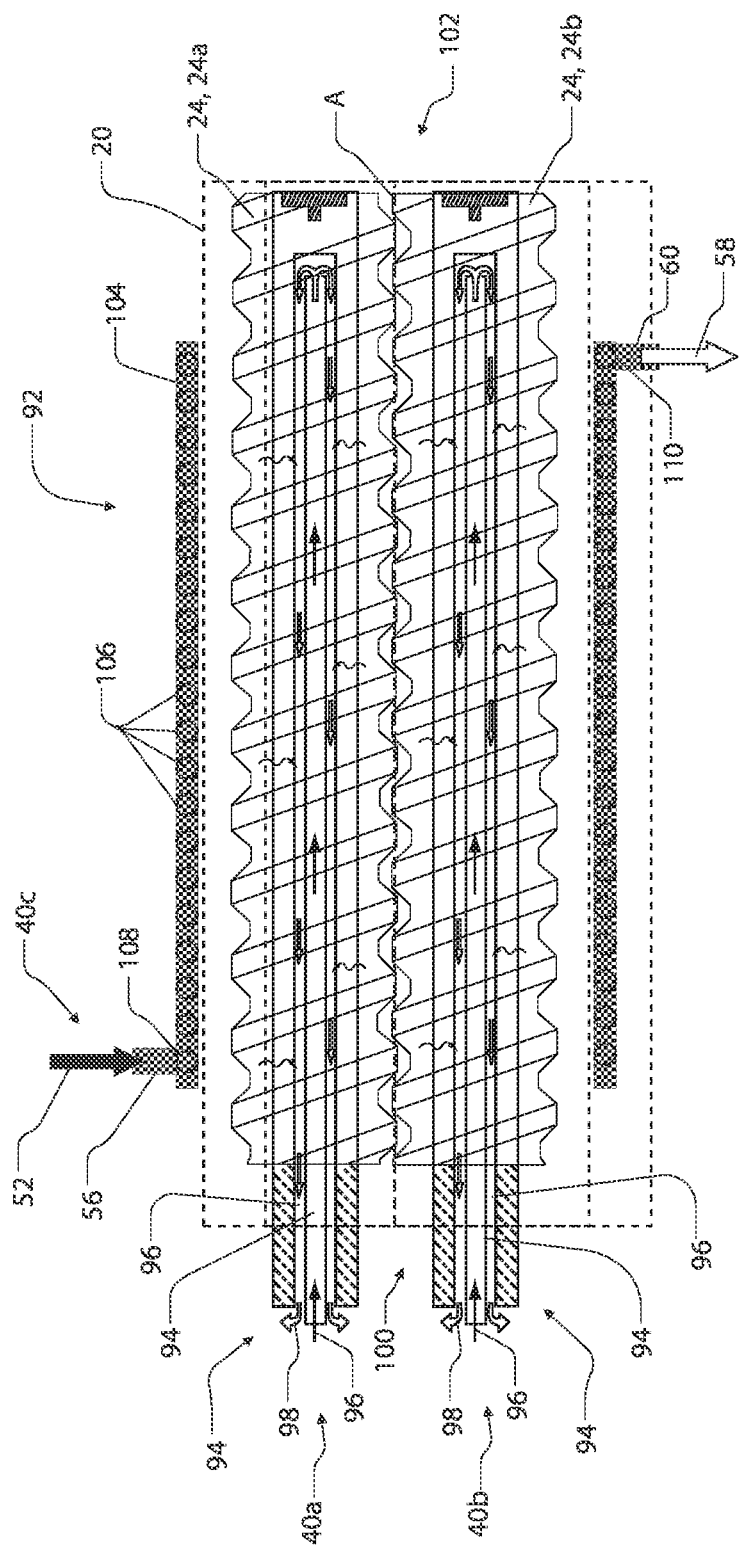
FIG. 2 is a schematic cross-sectional view of a barrel of an extruder demonstrating a portion of a cooling apparatus.

Referring to FIGS. 1 and 2, an example of an extrusion system 10 is shown. The system 10 generally comprises a supply unit 12 that supplies ceramic precursor batch mixture 14 to an extruder 16. For example, the ceramic precursor batch mixture 14 can comprise one or more inorganic particles such as alumina, silica, talc, clay, titania, magnesia, cordierite, mullite, aluminum titanate, etc., that during firing will react and/or sinter to form one or more ceramic phases, such as cordierite, mullite, aluminum titanate, silicon carbide, or others. The batch mixture 14 can comprise additional ingredients to facilitate the extrusion process. For example, the batch mixture 14 can comprise a liquid vehicle, such as water, pore formers, such as starch, graphite, or polymer beads, an organic binder, such as methylcellulose, lubricants, such as oils or fatty acids, and/or other additives to assist in one or more stages of the manufacturing process.

The supply unit 12 comprises a mixer that combines raw materials (e.g. minerals, water, oils, etc.) and supplies the batch mixture 14 to an inlet funnel 18. The inlet funnel 18 is in connection with a barrel 20 that forms a bore or interior passage 22 extending along a longitudinal axis A of the extruder 16. As shown, the extruder 16 comprises a series of barrels 20, which are referred to generally as a first barrel 20a, a second barrel 20b, a third barrel 20c, and a fourth barrel 20d. In operation, the batch mixture 14 is forced through each barrel 20 via one or more screws 24 and into a die cavity 26 of an extrusion die 28 through which the batch mixture 14 is pressed to form an extrudate 30. The extrudate 30 is then processed (e.g., cut, dried, fired) to form an extruded part. The examples provided are discussed in reference to the manufacture of honeycomb-shaped structures as commonly used in flow-through substrates and wall flow filters. However, applications of the disclosure are not so limited. As discussed herein, each of the components (barrels, screws, etc.) of one or more extruders are generally referred to as the extruder 16. Any reference to the extruder 16 discussed herein is non-limiting and may refer to multiple extruders, the components of an extruder, and/or similar equipment that may benefit from the apparatuses and methods introduced in this application. Accordingly, the devices and systems discussed herein can be flexibly implemented with different components or portions of the extruder 16.

The flow properties of the batch mixture 14 through the barrels 20 of the extruder 16 are temperature dependent. This means that variations in the temperature of the batch mixture 14 can cause variations in the flow of the batch mixture 14 through the extrusion die 28. Such variations can adversely affect the shape of the extrudate 30 due to non-uniform flow of the batch mixture 14 and consequently cause inconsistencies in the dimensions of the final articles or extruded parts. To control the temperature and limit the process variations caused by fluctuations in the flow of the batch mixture 14, at least one cooling apparatus 40 is in connection with the extruder 16. As shown in FIG. 1, the system 10 comprises multiple cooling apparatuses 40 that can independently control the cooling rate of each of the barrels 20 by controlling the supply temperature of coolant (e.g., water, glycol-water mixture, etc.) supplied through separate cooling circuits 42. In this way, the system 10 provides for highly accurate and responsive cooling of the extruder 16 to prevent flow variations that result in diminished quality of the resulting extruded parts. Though discussed specifically in reference to the temperature control and cooling of ceramic extrusion equipment, the cooling apparatus 40 is similarly suitable for cooling and temperature control of various extrusion manufacturing equipment and other temperature sensitive manufacturing processes.

As shown in FIG. 1, each of the cooling apparatuses 40 is configured to receive bulk coolant 44 from a delivery line 46 of a common bulk coolant supply 48 at an inlet 50. Examples of the cooling apparatus 40 are also shown in greater detail in FIGS. 3, 4, and 5. As discussed later in detail, the bulk coolant 44 is delivered at a common temperature to each cooling apparatus 40, and each cooling apparatus 40 independently adjusts the temperature of a supply coolant 52 delivered to the extruder 16. Accordingly, the temperature of the bulk coolant 44 as controlled by the bulk coolant supply 48 represents the minimum temperature of the supply coolant 52 delivered to the extruder 16. The temperature of the bulk coolant 44 is then increased by a selective recirculation process independently controlled in each of the cooling apparatuses 40. The bulk coolant 44 is utilized to efficiently cool each of the barrels 20, screws 24, and/or extruders 16 while independently adjusting the temperature of the supply coolant 52. In this way, the temperature of the supply coolant 52 in each of the cooling circuits 42 is controlled to accurately maintain the process temperatures and facilitate consistent flow of the batch mixture 14 as necessary to limit variations of the resulting extrudate 30.

Still referring to FIG. 1, a first cooling apparatus 40a is shown in connection with the first barrel 20a. Though the details are omitted for clarity, each of the second barrel 20b, third barrel 20c, and fourth barrel 20d are connected to similar cooling apparatuses 40. In this configuration, the temperature of coolant delivered to each of the barrels 20 is independently controlled by the operation of the cooling apparatuses 40. As discussed herein, the terms first, second, third, etc. are used for clarity in reference to the appended figures. However, these terms shall not be construed to limit the inventive concepts to any requisite number of elements necessary to define the invention unless expressly recited in the claims. Additionally, though depicted and described as being in connection with the barrels 20 and/or screws 24 of a single extruder 16, the cooling apparatuses 40 may be implemented with multiple extruders 16 and/or various heat generating equipment to independently deliver the supply coolant 52 at a supply temperature suitable to effectively cool the equipment at a desired rate. Additionally, by maximizing the conductive cooling efficiency at a constant flow rate as later discussed, the cooling apparatuses 40 provide effective cooling even in cases where the cooling capacity or heat absorption of the cooling apparatuses 40 must change drastically over short periods.

In order to independently control the supply temperature of the supply coolant 52, each cooling circuit 42 comprises at least one flow control device 54 that independently controls the supply temperature of the supply coolant 52 delivered to the corresponding barrel 20. The flow control device 54 can be implemented as a valve, pump, diverter or various devices that can control a rate of the bulk coolant 44 introduced into a supply line 56 of the cooling circuit 42. In coordination with the introduction of the bulk coolant 44, the flow control device 54 selectively diverts expelled coolant 58 output from the extruder 16 via a return line 60 through either an outlet 62 in connection with a coolant return 64 of the bulk coolant supply 48 or a circulation line 66 that connects the return line 60 to the supply line 56. The expelled coolant 58 directed to the coolant return 64 is referred to as a returned portion 68 while the expelled coolant directed to the circulation line 66 is a recirculated portion 70. The circulation line 66 returns the recirculated portion 70 of the expelled coolant 58 to the supply line 56. By controlling the flow control device 54, a ratio or proportion of the expelled coolant 58 to the bulk coolant 44 is controlled by the cooling apparatus 40, and consequently, the temperature of the supply coolant 52 in the supply line 56 is adjusted.

As a result of cooling the extruder 16, the expelled coolant 58 has an elevated temperature relative to the supply coolant 52. Accordingly, the cooling apparatus 40 is capable of increasing the temperature of the supply coolant 52 by increasing the recirculated portion 70 and decreasing the introduction of the bulk coolant 44 by controlling the at least one flow control device 54. Each of the flow control devices 54 of the cooling circuits 42 are controlled by one or more process controllers 72 (e.g., programmable logic controller [PLCs]). As shown, the process controller 72 may be in communication with the flow control devices 54 as well as various sensors, pumps, or other control devices via a communication interface 74 (e.g., Ethernet, Modbus, Wi-Fi, etc.). Accordingly, a ratio of the expelled coolant 58 to the bulk coolant 44 supplied to the extruder 16 by each of the individual cooling circuits 42 is controlled to independently adjust the supply temperature of the supply coolant 52 delivered to each extruder 16 or stage (e.g., barrel 20, screw 24) of the extruder 16. As each extruder 16 or stage has a different heat load that varies over time, the independent control of the supply temperature improves temperature control, particularly when combined with a constant flow rate of the coolant within each of the cooling circuits 42.

In addition to the independent temperature control of the supply coolant 52, each of the cooling apparatuses 40 independently controls the flow rate of the supply coolant 52. To be clear, the independent control is not only independently controlled among the separate cooling apparatuses 40 but is also controlled independent of the ratio of the bulk coolant 44 to the expelled coolant 58. The flow rate of the coolant through each of the cooling circuits 42 is controlled via a pump 76 (e.g. centrifugal, screw spindle, suction, etc.). The pump 76 may correspond to a second flow control device and is in connection with the supply line 56 downstream of the circulation line 66 along a flow path 78 of the supply coolant 52. The flow rate of the coolant in the cooling circuit 42 is monitored by the process controller 72 via a flow meter 80, which may be implanted as a vortex shedding meter, an ultrasonic meter, or various flow detection devices. In response to the flow rate of the coolant, the process controller 72 may adjust the transmission rate of the pump 76 by adjusting the power input or frequency (e.g., via a variable frequency drive [VFD]). In this way, the flow rate of coolant through each of the cooling circuits 42 is independently controlled and monitored by the process controller 72 and can be controlled to offset variations in pressure of the bulk coolant 44 from the bulk coolant supply 48.

The independent flow rate control of the coolant in each of the cooling circuits 42 is facilitated by the cooling apparatuses 40 by decoupling the mixing of the bulk coolant 44 with recirculated portion 70 of the expelled coolant 58 from the flow rate through the cooling circuit 42. As previously discussed, the flow rate of each cooling circuit 42 maintains the supply of coolant to the supply line 56 by drawing the recirculated portion 70 of the expelled coolant 58 through the circulation line 66 as necessary to mix with the bulk supply coolant 44. Additionally, each cooling circuit 42 comprises a bypass line 82 that also fluidly connects the return line 60 to the supply line 56. As shown in FIG. 1, the bypass line 82 is upstream of the circulation line 66 relative to a flow path 78 of the supply coolant 52. The flow control device 54 is in connection with the bypass line 82 and selectively diverts the expelled coolant 58 between the circulation line 66 and the coolant return 64. At the same time, bulk coolant 44 is introduced to offset the returned portion 68 of the expelled coolant 58. In this configuration, the overall volume of coolant in each of the cooling circuits 42 is maintained by introducing bulk coolant 44 at the same rate that the expelled coolant 58 is returned to the bulk coolant supply 48.

In some implementations, the flow control device 54 is a three-way valve in connection with the return line 60, the bypass line 82, and the coolant return 64. The three-way valve is positioned downstream of the circulation line 66 along the flow path 78 of the expelled coolant 58 through the return line 60. The three-way valve is in communication with the process controller 72, which controls the valve configuration varying the rate at which the expelled coolant is either recirculated as the recirculated portion 70 or returned to the coolant return 64 as the returned portion 68. Concurrently, as the three-way valve increases the recirculated portion 70, the flow path through the bypass line 82 is opened, such that the bulk coolant 44 is only drawn into the supply line 56 at the rate of the returned portion 68 of the expelled coolant 58 that is returned to the bulk coolant supply 48. Though discussed in specific reference to the three-way valve, it shall be understood that the flow control discussed herein may be adjusted similarly by additional pumps that introduce the bulk coolant 44 and expel the returned portion 68 as well as multiple two-way valves operated in coordination to provide similar functionality to the three-way valve. Accordingly, the inventive subject matter of the disclosure can be flexibly implemented without departing from the spirit of the invention.

The independent temperature control of the supply coolant 52 provides superior control over the cooling rate of the extruder(s) 16 compared to varying the flow rate of the supply coolant 52 in combination with adjusting the temperature of the bulk coolant 44. The primary benefit of adjusting the cooling rate based on the temperature of the supply coolant 52 in each of the cooling circuits 42 rather than the flow rate is that temperature-based control is more predictable. That is, temperature based control of the supply coolant 52 in each of the cooling circuits 42 at a constant flow rate provides for a nearly linear response in the cooling rate. Additionally, temperature control in the cooling circuits 42 is more responsive as there can be significant delay associated with varying the temperature of the bulk coolant 44. Finally, adjustment of the temperature of the bulk coolant 44 may only improve the cooling process in some of the connected cooling circuits 42 while overcooling or allowing heat to build up in others. Accordingly, systems that operate by varying the flow rate of the coolant in each cooling circuit and/or vary the temperature of the bulk coolant include a number of inherent complications that are resolved by the disclosed cooling apparatus 40.

The system 10 improves the control of the cooling rate for each of the cooling circuits 42 by independently controlling the temperature of the supply coolant 52. Additionally, the flow rate of each of the cooling circuits 42 is maintained at a constant flow rate, such that the rate of cooling of the cooling circuits is nearly linear. To be clear, the flow rate in each of the cooling circuits 42 may vary as controlled by the pump 76. However, the flow rate within each of the cooling circuits 42 can be independently controlled and maintained at a constant flow rate for each associated manufacturing process. The flow rate of the supply coolant 52 in each of the cooling circuits 42 is maintained at a constant rate by the process controller 72 by monitoring the flow meter 80. In this way, the cooling rate of each cooling circuit 42 is adjusted in response to variations in the heat load of the extruder 16 by varying the temperature of the supply coolant 52 while maintaining the flow rate.

Due to the varying heat loads associated with each of the cooling apparatuses 40, the cooling circuits 42 may be designed with varying volumetric capacities. The capacity of each of the cooling circuits 42 primarily depends on the flow rate, which is determined based on the heat load and the temperature of the bulk coolant 44. Accordingly, each of the components (e.g., the pipe or conduit size, capacity of the pump 76, etc.) of the cooling circuits 42 is designed to be compatible with the volumetric flow rate necessary to effectively cool the heat load of the connected component or segment of the extruder 16. In various implementations, the cooling circuits 42 are configured to transport coolant at a rate that ranges from about 0 gpm to about 40 gpm. For example the cooling circuits can transport coolant at a flow rate of 0 gpm, 5 gpm, 10 gpm, 15 gpm, 20 gpm, 25 gpm, 30 gpm, 35 gpm, 40 gpm, and all coolant flow rates between these levels.

Controlling the temperature of the supply coolant 52 is further achieved by monitoring a plurality of temperature probes 90 or sensors. For example, each cooling apparatus 40 can comprise a supply temperature probe or supply probe 90a, a return probe 90b, and a barrel probe 90c. The supply probe 90a measures the temperature of the supply coolant 52, the return probe 90b measures the temperature of the expelled coolant 58, and the barrel probe 90c measures the temperature of the barrel 20 providing an indication of the temperature of the precursor batch mixture 14. Each of the temperature probes 90 reports temperature data to the process controller 72 via the communication interface 74. In operation, the process controller 72 monitors the response(s) of the return temperature probe 90b and the barrel temperature probe 90c to the temperature of the delivered supply coolant 52 indicated by the supply probe 90a to control the configuration (e.g., the valve position) of the flow control device 54. By controlling the configuration of the flow control device 54, the process controller 72 adjusts the resulting ratio of the expelled coolant 58 to the bulk coolant 44 forming the supply coolant 52.

In operation, the cooling response of each of the cooling circuits 42 of the cooling apparatuses 40 may vary widely based on the particular extrusion process or component (e.g., barrel 20, screw 24) to which the supply coolant 52 is delivered. In order to tune the response of each of the cooling circuits 42, the process controller 72 can implement individual proportional-integral-derivative (PID) control schemes to account for delays in the system response and limit overcooling or undercooling the extruder(s) 16 in response to fluctuations in the heat load. More specifically, the tuning parameters (e.g., gain, reset, preact) for each of the cooling circuits 42 can be calculated by observing the uncontrolled response of each cooling circuit 42. Once observed, the tuning parameters may be calculated and adjusted to prevent over/undershoot of each target barrel temperature identified by the barrel probe 90c. As previously discussed, accurate temperature control of the cooling circuits 42 can be improved by maintaining a constant flow rate of the supply coolant 52, which also simplifies the tuning of the PID control schemes because the cooling rate is primarily linear in response to varying the temperature of the supply coolant 52.

In general, the disclosure provides for the temperature of the coolant to be increased as a result of absorbing the heat energy from the extruder 16. However, in some situations (e.g., startup conditions), the extruder 16 may not have sufficient heat energy to increase the temperature of the expelled coolant 58 relative to the supply coolant 52. Accordingly, the cooling apparatus 40 can more generally be implemented as a temperature control apparatus comprising a heating apparatus 91. In operation, the heating apparatus 91 can receive the coolant and return the coolant along the cooling circuit 42 with an increased temperature. In general, the heating apparatus 91 can be incorporated along the cooling circuit 42 along a portion through which the coolant can be returned through the circulation line 66. Accordingly, though the heating apparatus 91 is shown down stream of extruder 16 along the flow path 78, the heating apparatus 91 may be flexibly incorporated along the cooling circuit 42. Examples of specific devices of the heating apparatus 91 include hydronic coolant heaters, heat exchangers, and/or various suitable heat generating devices.

Referring now to FIG. 2, a cross-sectional view of a twin-screw extruder is shown demonstrating the barrel 20 forming the interior passage 22 with the first screw 24a and the second screw 24b extending along the longitudinal axis A. As depicted, the extruder 16 comprises a barrel cooling loop 92 extending along the barrel 20 and a screw cooling loop 94 extending through each of the screws 24a, 24b. As previously discussed, each of the cooling circuits 42 of the cooling apparatuses 40 may be in connection with various components of the extruder 16 as well as multiple extruders or heat generating devices. In the example shown in FIG. 2, the first cooling apparatus 40a is in connection with the first screw 24a, the second cooling apparatus 40b is in connection with the second screw 24b, and the third cooling apparatus 40c is in connection with the barrel 20 of the extruder 16. In this configuration, the supply temperatures of the supply coolant 52 delivered to each of the screws 24a, 24b, and the barrel 20 are independently controlled by the corresponding first cooling apparatus 40a, second cooling apparatus 40b, and third cooling apparatus 40c, respectively.

To provide cooling within the screws 24a, 24b, the screw cooling loop 94 comprises a coolant delivery passage 96 and coolant return passage 98 extending through the screws 24a, 24b between the barrel inlet end 100 and the barrel discharge end 102. In operation, the rotation of the screws 24a, 24b causes the batch mixture 14 to flow from the barrel inlet end 100 to the barrel discharge end 102. Accordingly, the screws 24a, 24b are exposed to the heat load attributed to the precursor batch mixture 14 passing through the extruder 16. The coolant delivery passage 96 receives the supply coolant 52 from the supply line 56 and communicates the coolant over a length of each of the screws 24a, 24b from the barrel inlet end 100 to the barrel discharge end 102. Driven by the flow rate of the supply coolant 52 from the supply line 56, the coolant passes from the delivery passage 96 to the return passage 98, which provides a path from the barrel discharge end 102 back to the barrel inlet end 100 of each of the screws 24a, 24b. The return passage 98 is in connection with the return line 60 of each of the cooling circuits 42 (i.e., the first cooling apparatus 40a and the second cooling apparatus 40b). The flow of the coolant through the passages 96, 98 of the screws 24a, 24b provides for absorption of a portion of the heat load of the extruder 16, and the rate of the cooling is controlled by each of the first and second cooling apparatuses 40a, 40b by adjusting the supply temperature of the supply coolant 52 and the flow rate through the cooling circuits 42.

The barrel cooling loop 92 is implemented in a cooling jacket 104 surrounding and in thermally conductive connection with at least a portion of the barrel 20. Within the cooling jacket 104, the barrel cooling loop 92 consists of multiple cooling channels 106 through which the supply coolant 52 is delivered via a jacket inlet 108. The cooling channels 106 communicate the coolant intimately over a portion of the length of the barrel 20 between the inlet end 100 to the barrel discharge end 102. The supply coolant 52 is delivered to the jacket inlet 108, travels through the cooling channels 106, and is released through a jacket outlet 110 in connection with the return line 60 of the third cooling apparatus 40c. The coolant communicated through the cooling channels 106 is exposed to a portion of the heat load released from the barrel 20. The portion of the heat load absorbed by the coolant is transferred as heat energy in the form of an increased temperature of the expelled coolant 58 to the return line of the cooling apparatus 40 (i.e., the third cooling apparatus 40c).

Figure 3:
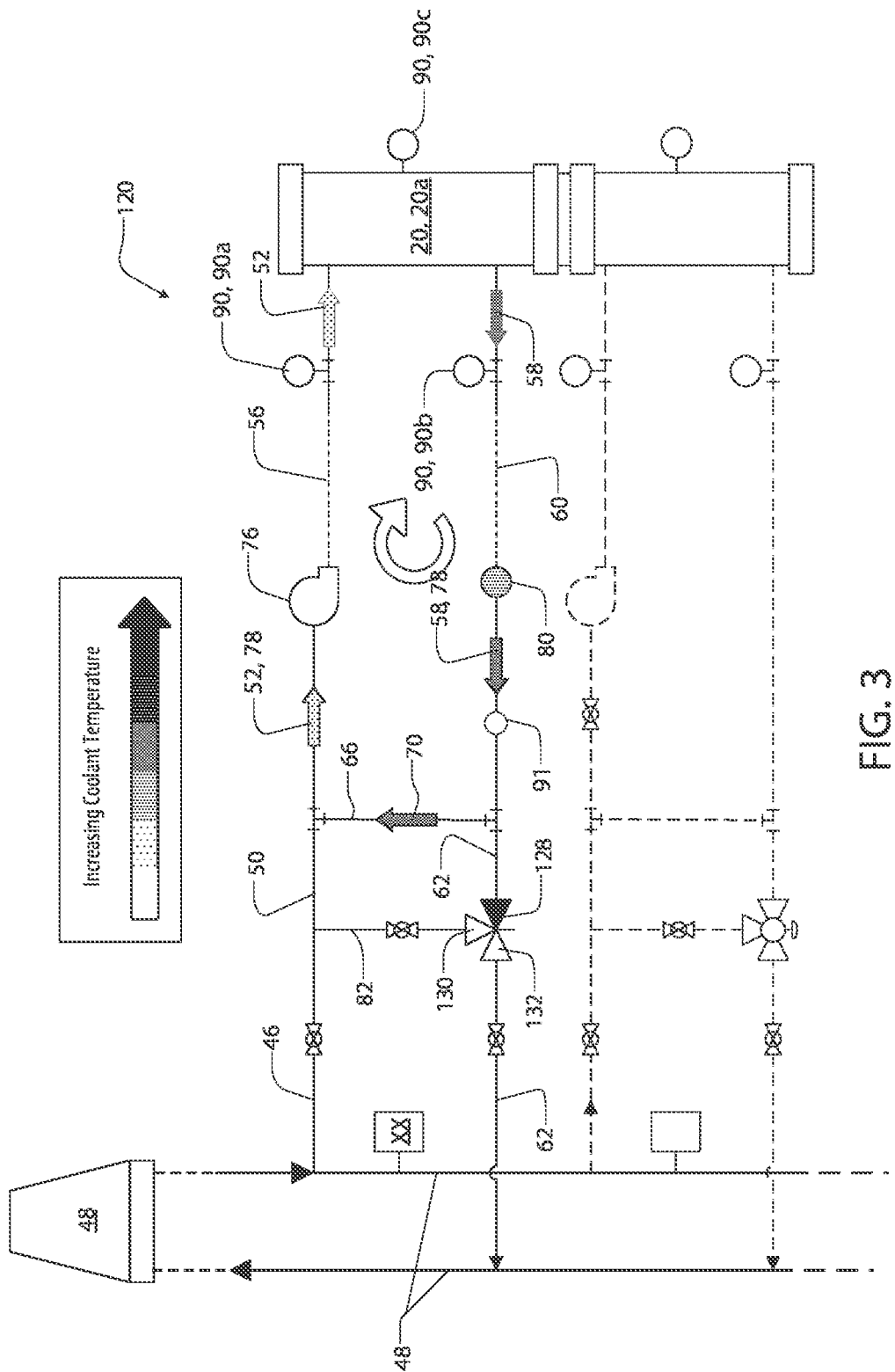
FIG. 3 is a schematic diagram of a cooling apparatus demonstrating a coolant recirculation state.
Figure 4:
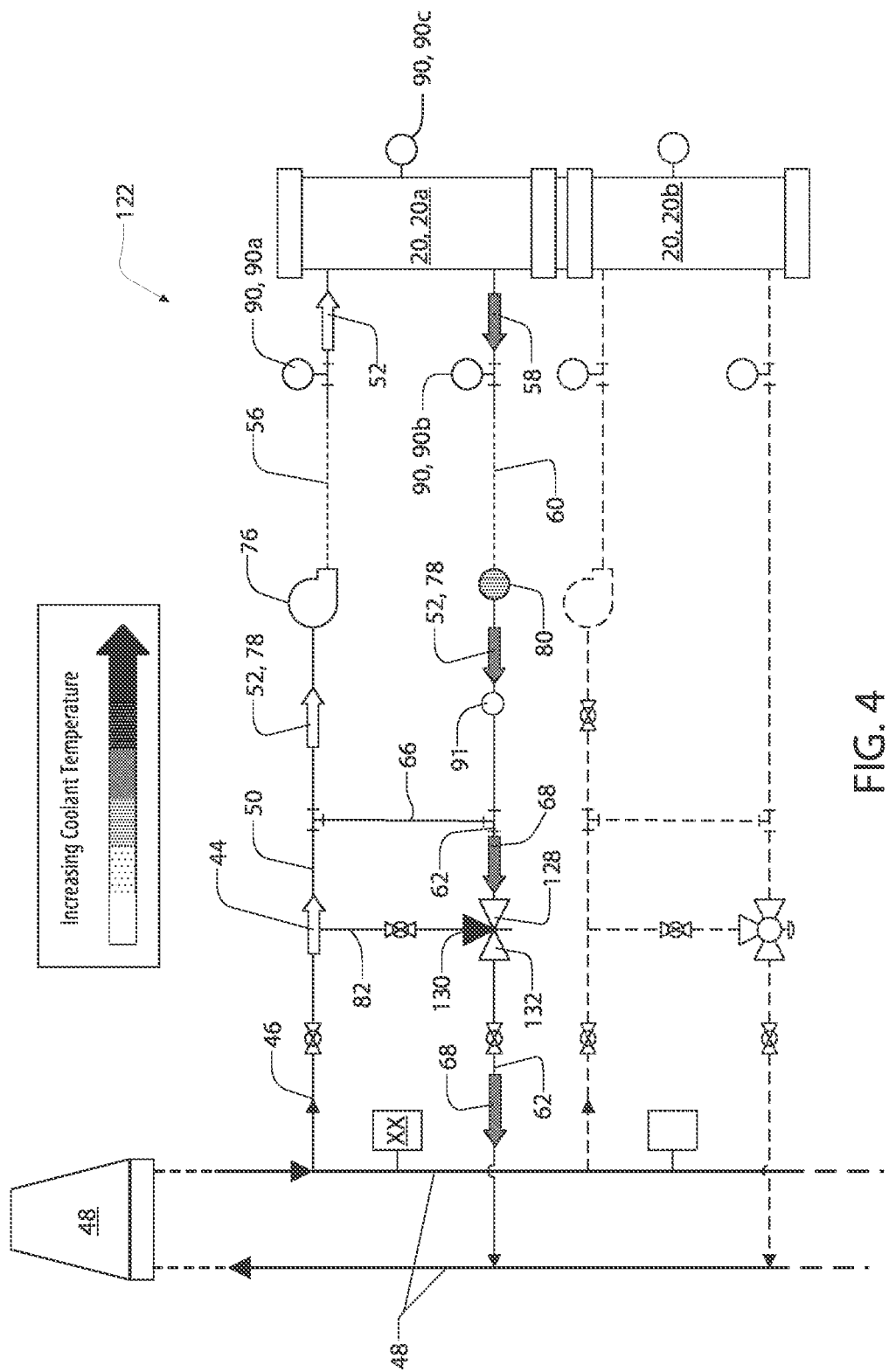
FIG. 4 is a schematic diagram of a cooling apparatus demonstrating a maximum cooling state.
Figure 5:
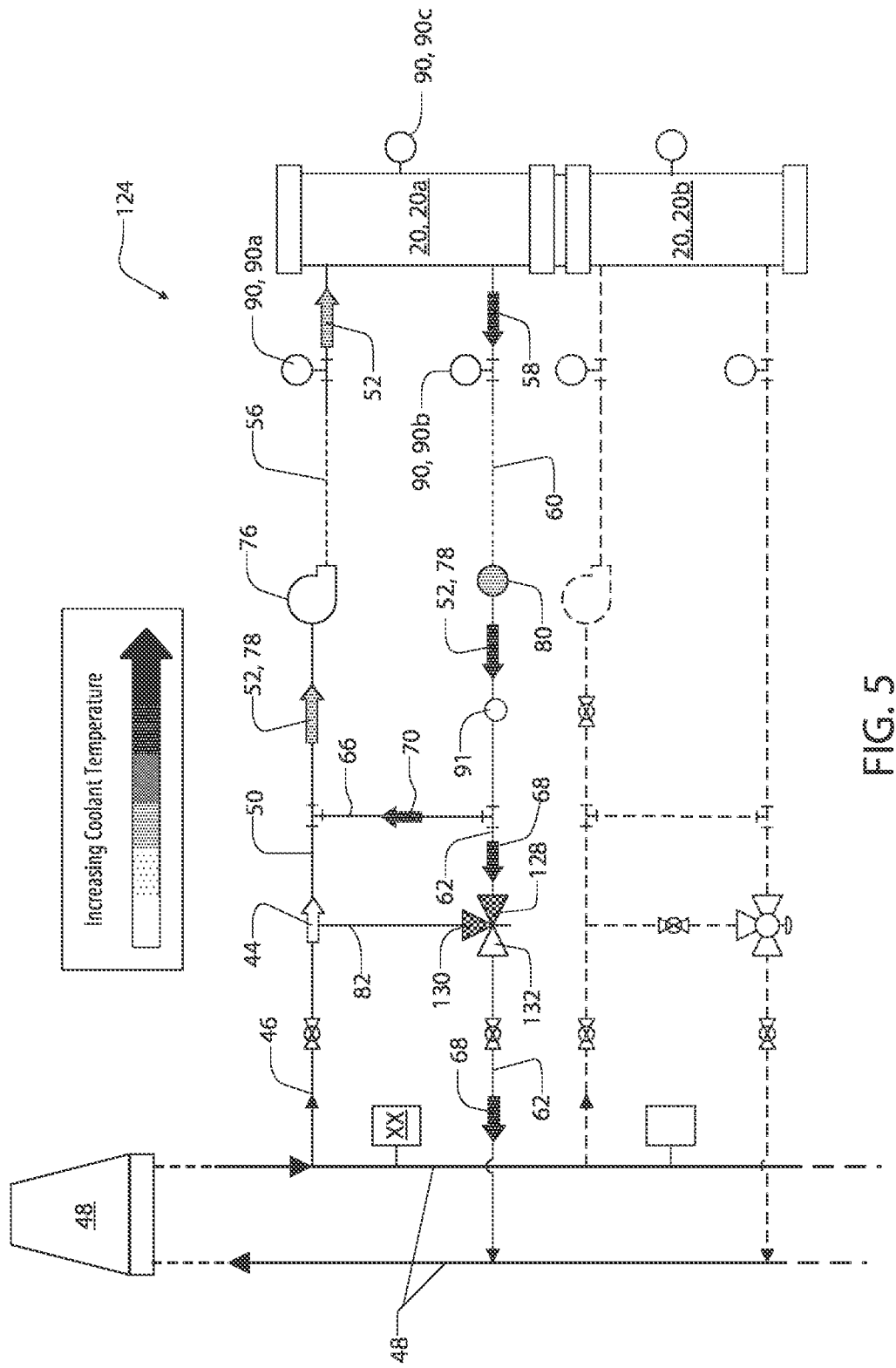
FIG. 5 is a schematic diagram of a cooling apparatus demonstrating a mixed recirculation cooling state.

Referring now to FIGS. 3, 4, and 5, schematic diagrams of different control states for the cooling apparatus 40 are described in further detail. FIG. 3 demonstrates a recirculation cooling state 120, FIG. 4 demonstrates a maximum cooling state 122, and FIG. 5 demonstrates a mixed recirculation state 124. In operation, each cooling apparatus 40 controls the cooling rate of the associated cooling circuit 42 by varying the temperature of the supply coolant 52 between the recirculation cooling state 120 and the maximum cooling state 122. The recirculation cooling state 120 gradually increases the temperature of the supply coolant 52 based on the temperature increase of the expelled coolant 58, and the maximum cooling state 122 decreases the temperature of the supply coolant 52 to the temperature of the bulk coolant 44. During steady-state operation of the extruder(s) 16, each cooling apparatus 40 typically operates in the mixed cooling state 124, between the recirculation cooling state 120 and the maximum cooling state 122. The mixed cooling state 124 controls the temperature of the supply coolant above the temperature of the bulk coolant 44. Each of the cooling circuits 42 is designed to maintain steady-state operation in the mixed recirculation cooling state 124 by ensuring that the cooling apparatuses 40 have a surplus of cooling capacity for the corresponding heat load of the extruder 16. In this way, temperature control is accurately maintained by increasing and decreasing the temperature of the supply coolant 52 as necessary to control the temperature of the batch mixture 14. As discussed herein, each of the components (the barrel 20, the screws 24, etc.) of the extruder 16 are generally referred to as the extruder 16. However, it shall be understood that each of the cooling apparatuses 40 may independently control the cooling of individual barrels 20 (e.g., first barrel 20a, second barrel 20b, etc.), screws 24 (e.g., first screw 24a, second screw 24b, etc.), and other equipment associated with manufacturing processes. Accordingly, the cooling apparatuses 40 can be flexibly implemented to independently cool different components or portions of the extruder 16 at different rates.

As shown in FIG. 3, the recirculation cooling state 120 operates to heat the supply coolant 52 by recirculating the expelled coolant 58 through the circulation line 66. The three-way valve exemplifying the flow control device 54 is shown having a first valve inlet 128 controlled to a closed configuration by the process controller 72. In this configuration, the entirety of the expelled coolant 58 is communicated by the pump 76 to the circulation line 66 as the recirculated portion 70 and becomes the supply coolant 52. The repeated return of the expelled coolant 58 through the return line 60 causes the supply coolant 52 communicated through the supply line 56 to heat as a result of the repeated exposure to the heat load of the extruder 16. The recirculation cooling state 120 may be maintained until the supply coolant 52 approximately reaches the temperature of the extruder 16, such that the cooling apparatus 40 only provides marginal cooling of the extruder 16. Accordingly, the recirculation cooling state 120 may be activated to allow the temperature of the extruder 16 to climb during start up or under circumstances where limited cooling is desired.

As demonstrated in FIG. 4, the maximum cooling state 122 is activated by the flow control device 54 controlling the entirety of the expelled coolant 58 to be diverted to the coolant return 64 of the bulk coolant supply 48. As exemplified by the three-way valve, the maximum cooling state 122 can be activated by closing a second valve inlet 130 in connection with the bypass line 82 and opening the first valve inlet 128. With the second valve inlet 130 closed, the expelled coolant 58 flows into the first valve inlet 128 and out of a valve outlet 132, such that the expelled coolant 58 is returned to the bulk coolant supply 48 via the coolant return 64. In this configuration, the bulk coolant 44 is essentially the sole contributing source of the supply coolant 52, such that the supply coolant 52 communicated to the extruder 16 via the supply line 56 has a supply temperature that nearly matches the temperature of the bulk coolant 44. The maximum cooling state 122 serves to absorb large heat loads and the corresponding temperature of the bulk coolant 44 may be controlled based on the maximum heat load and corresponding cooling capacity necessary for the connected cooling apparatuses 40.

The cooling capacity required among the cooling apparatuses 40 supplied by the bulk coolant supply 48 may be the primary determining factor for setting the temperature of the bulk coolant 44. For example, based on empirical information and temperature data, one of the cooling apparatuses 40 in connection with the bulk coolant supply 48 can be identified as having a maximum heat load compared to the remaining cooling apparatuses 40 that share the connection to the bulk coolant supply 48. Accordingly, the temperature of the bulk coolant 44 is controlled such that the cooling apparatus 40 with the maximum heat load has sufficient cooling capacity (preferably excess capacity) to effectively cool the maximum heat load of the extruder(s) 16. The remaining cooling apparatuses 40, which are required to have less cooling capacity, simply operate in the mixed recirculation state 124 to heat the bulk coolant 44 as necessary. In this way, the maximum cooling state 122 provides adequate cooling with the bulk coolant 44 to satisfy the cooling requirements for each of the cooling apparatuses 40 in connection with the bulk coolant supply 48.

Referring now to FIG. 5, the mixed recirculation state 124 is activated by the process controller 72 to increase the temperature of the bulk coolant 44 to suit the cooling needs of the heat load associated with the extruder 16. In the mixed recirculation state 124, the flow control device 54 controls the ratio or proportion of the expelled coolant 58 to the bulk coolant 44 that forms the supply coolant 52. Continuing the example of the flow control device 54 implemented as the three-way valve, the process controller 72 is configured to adjust the returned portion 68 of the expelled coolant that passes through the first valve inlet 128 and out through the valve outlet 132. Because the pump 76 forces the supply coolant 52 and expelled coolant 58 through the cooling circuit 42, the portion of the expelled coolant 58 that does not pass through the flow control device 54 to the coolant return 64 is communicated through the circulation line 66 and mixed with the bulk coolant 44 to form the supply coolant 52. Additionally, since the flow rate through the cooling circuit 42 is maintained at a constant rate, the rate at which the bulk coolant 44 is introduced and mixed into the supply coolant 52 is the same rate at which the returned portion 68 of the expelled coolant 58 is returned to the bulk coolant supply 48 via the coolant return 64. Accordingly, the control of the three-way valve concurrently adjusts the rate at which the expelled coolant 58 is returned to the bulk coolant supply 48 while also causing the recirculated portion 70 of the expelled coolant 58 to return to the supply line 56 via circulation line 66.

Still referring to FIG. 5, temperature control of the supply coolant 52 is achieved by the process controller 72 by monitoring the temperatures of each of the temperature probes 90 and adjusting a recirculation rate of the expelled coolant 58. More specifically, the process controller 72 may monitor the barrel probe 90c to determine if a temperature of the precursor batch mixture 14 is above or below a target processing temperature. In response to the temperature reported by the barrel probe 90c being higher than the target temperature, the process controller 72 may control the flow control device 54 to increase the flow rate of the expelled coolant 58 through the first valve inlet 128, such that the returned portion 68 of the expelled coolant 58 decreases. In response to the decrease in the recirculated portion 70 of the expelled coolant 58, a corresponding increase in the bulk coolant 44 is diverted to the supply line 56 and decreases the temperature of the supply coolant 52. The temperature of the supply coolant 52 as controlled by the flow control device 54 may be monitored by the process controller 72 based on the temperature reported by the supply probe 90a. Similarly, the rate of heat absorption achieved by the supply coolant 52 may be monitored by the process controller 72 by comparing the temperatures reported by the supply probe 90a and the return probe 90b. In this way, the process controller 72 may rapidly adjust the temperature of the supply coolant 52 to control the process temperature of the precursor batch mixture as reported by barrel probe 90c.

By varying operation among the operating states 120, 122, and 124, the controller 72 of the cooling apparatus 40 can achieve significant improvements in operation. A test model of the cooling apparatus 40 was measured to achieve a change in steady-state temperature of 2° C. for the supply coolant 52 in a time of less than 15 minutes. In fact, the performance of the cooling apparatus was measured to achieve a change in the steady-state temperature of 2° C. for the supply coolant 52 in less than 10 minutes and even within 5 minutes. When compared to systems that rely on adjusting the temperature of bulk coolant to multiple cooling circuits, the localized, independent control of the temperature of the supply coolant 52 of each of the disclosed cooling circuits 42 provides for significant improvements. For example, adjusting the temperature of bulk coolant can take approximately 30-60 minutes to achieve a similar change in steady-state temperature of 2° C. As discussed herein, the steady-state temperature is where the supply coolant 52, as delivered to the extruder 16 (e.g., the components, barrels, screws, etc.), is controlled to an average temperature within 0.5° C. of a target set-point temperature controlled by the controller 72. The average temperature may be measured over a time interval of 10 minutes, or less. Accordingly, the cooling apparatus 40 provides for a significant improvement in process control and response time to control the temperature of the components (e.g., barrels, screws, etc.) of the extruder 16 as well as other heat generating devices and temperature sensitive processes.

Figure 6:
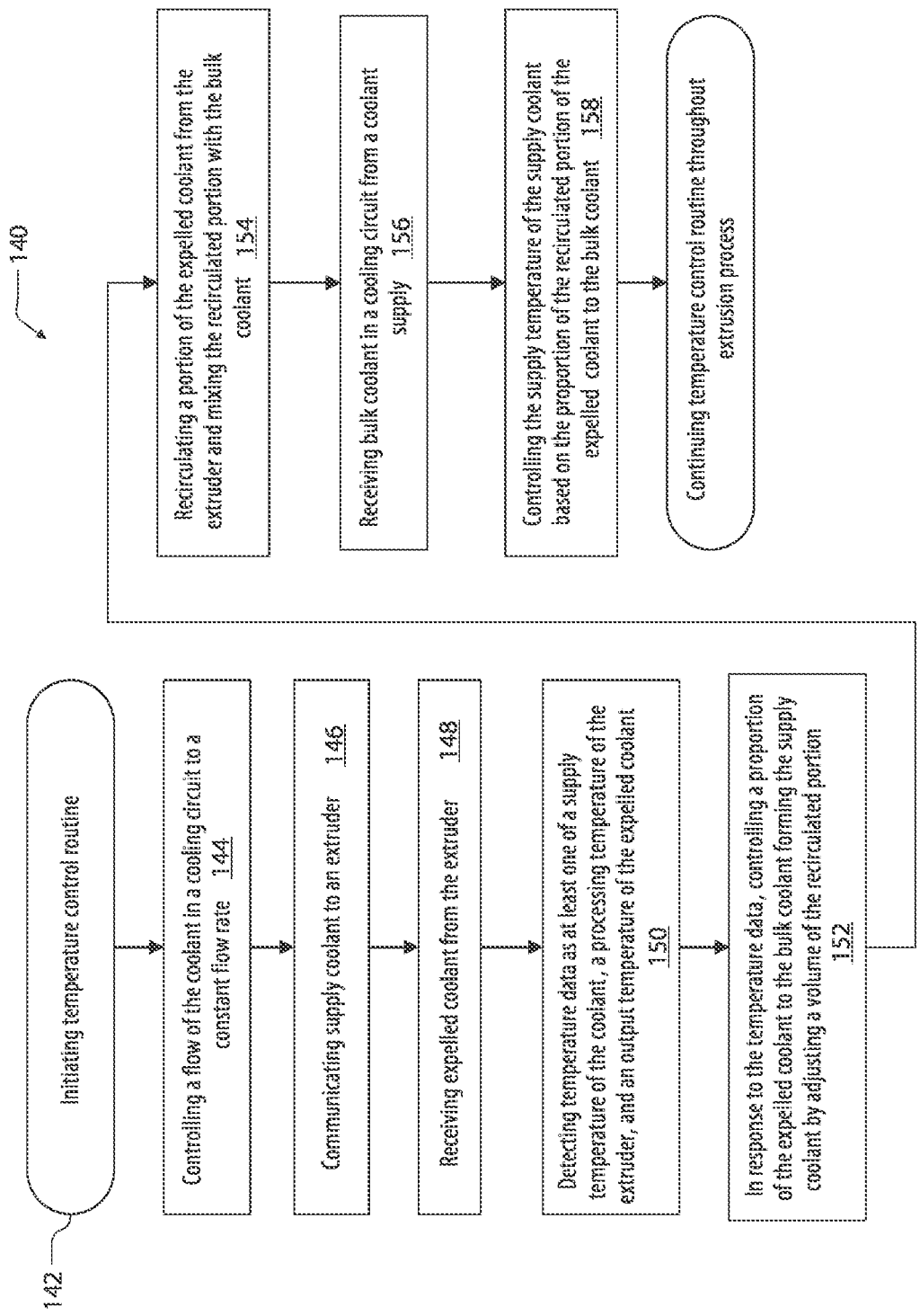
FIG. 6 is a flow chart demonstrating a temperature control routine in accordance with the disclosure.

Referring now to FIG. 6, a flow chart is shown demonstrating a temperature control routine 140 for an extrusion manufacturing process. The temperature control routine 140 begins in step 142 in response to the activation of the extrusion system 10. In general, the temperature control routine begins by controlling a flow rate of the supply coolant 52 through the cooling circuit 42 to a constant rate (144). In steps 146 and 148, the supply coolant 52 is communicated to the extruder 16 via the supply line 56, and the expelled coolant 58 is returned to the cooling circuit 42 via the return line 60. While controlling the communication of the supply coolant 52 to the extruder 16, the process controller 72 detects the temperature data associated with the supply coolant 52, the expelled coolant 58, and the processing temperature of the batch mixture 14 (150). As previously discussed, the cooling apparatus 40 comprises temperature probes 90 that monitor the temperature of the supply coolant 52, the expelled coolant 58, and a temperature of the barrel 20 of the extruder 16 to monitor the processing temperature of the batch mixture 14.

In response to the temperature data, the process controller 72 controls a proportion or ratio of the expelled coolant 58 to the bulk coolant 44, the combination of which forms the supply coolant 52 (152). The adjustment of the recirculated portion 70 of the expelled coolant 58 is controlled by adjusting the flow control device 54 to increase or decrease the rate at which the expelled coolant 58 flows through the circulation line 66. The returned portion 68 of the expelled coolant 58 communicated through the circulation line 66 is mixed with a complementary volume of the bulk coolant 44, the combination of which flows through the supply line 56 to form the supply coolant 52 (154). That is, the portion of the bulk coolant 44 necessary to maintain the constant flow rate through the cooling circuit 42 is received from the delivery line 46 of the bulk coolant supply 48 and is mixed with the expelled coolant 58 to provide the supply coolant 52 (156). Accordingly, by controlling the ratio of the expelled coolant 58 to the bulk coolant 44 that is mixed to form the supply coolant 52, the process controller 72 controls the supply temperature of the supply coolant 52 (158). The temperature control routine 140 may continue throughout the extrusion process. It will be understood that any described processes or steps within described processes may be combined with other disclosed processes or steps to form structures within the scope of the present device. The exemplary structures and processes disclosed herein are for illustrative purposes and are not to be construed as limiting.

According to a first aspect, a cooling apparatus for an extrusion manufacturing system is provided that comprises a plurality of cooling circuits for at least one extruder. The apparatus comprises a supply circuit in fluid connection with a coolant supply that distributes bulk coolant to the plurality of cooling circuits. Each of the plurality of cooling circuits is in connection with the supply circuit via a first flow control device. Each of the of cooling circuits comprises an inlet that supplies the bulk coolant to a supply line. The supply line delivers supply coolant to the at least one extruder. A return line communicates expelled coolant from the at least one extruder. A circulation line connects the supply line to the return line. The circulation line supplies a recirculated portion of the expelled coolant to the supply line and mixes the bulk coolant with the recirculated portion forming the supply coolant.

According to a second aspect, the first aspect is provided, wherein the first flow control device controls a proportion of the expelled coolant to the bulk coolant forming the supply coolant.

According to a third aspect, the second aspect is provided, wherein an extrusion temperature of the at least one extruder is controlled by adjusting the proportion of the expelled coolant to the bulk coolant forming the supply coolant.

According to a fourth aspect, the second aspect is provided, further comprising a temperature sensor in connection with at least one of the supply line and the return line, wherein the temperature sensor detects a temperature of the coolant.

According to a fifth aspect, the fourth aspect is provided, further comprising a controller configured to control the proportion of the expelled coolant in response to the temperature of the coolant.

According to a sixth aspect, the fifth aspect is provided, wherein the first flow control device is a valve.

According to a seventh aspect, the sixth aspect is provided, wherein the controller is further configured to control a pump to maintain a constant flow rate of the supply coolant through the supply line and control the temperature of the coolant by adjusting a position of the valve.

According to an eighth aspect, the sixth aspect is provided, wherein the at least one extruder comprises a barrel and at least one screw, and wherein the plurality of cooling circuits comprise a barrel cooling circuit that cools the barrel and a screw cooling circuit that cools the at least one screw.

According to a ninth aspect, the eighth aspect is provided, wherein the controller is configured to independently control the temperature of the coolant in the barrel cooling circuit and the screw cooling circuit by controlling the valves of the barrel cooling circuit and the screw cooling circuit.

According to a tenth aspect, the first aspect is provided, wherein the plurality of cooling circuits each further comprise a second flow control device in connection with at least one of the supply line and the return line, and wherein the second flow control device controls a flow rate of the supply coolant through the supply line.

According to an eleventh aspect, the tenth aspect is provided, wherein the second flow control device is a pump.

According to a twelfth aspect, the first aspect is provided, wherein the first flow control device controls a supply of the bulk coolant received by the supply line.

According to a thirteenth aspect, the first aspect is provided, wherein each of the plurality of cooling circuits further comprise a bypass line connecting the supply line to the return line.

According to a fourteenth aspect, the thirteenth aspect is provided, wherein the first flow control device controls a return of the bulk coolant returned to the supply circuit via the bypass line.

According to a fifteenth aspect, the thirteenth aspect is provided, wherein the first flow control device is a three-way valve in connection with the return line, the bypass line, and an outlet to the supply circuit.

According to a sixteenth aspect, the fifteenth aspect is provided, wherein the three-way valve controls a ratio of the bulk coolant to the expelled coolant communicated through the supply line.

According to a seventeenth aspect, the first aspect is provided, wherein the supply circuit delivers the bulk coolant at a common temperature to each of the plurality of cooling circuits from the cooling supply.

According to an eighteenth aspect, a cooling apparatus for an extruder for extruding structures from a ceramic-forming mixture is disclosed. The cooling apparatus comprises a supply line configured to receive bulk coolant from a supply circuit via an inlet. The supply line delivers a supply coolant to the extruder along a flow path. A return line communicates expelled coolant from the extruder, and a circulation line connects the supply line to the return line. The circulation line supplies a recirculated portion of the expelled coolant to the supply line and mixes the bulk coolant with the recirculated portion of the expelled coolant forming the supply coolant. A bypass line connects the supply line to the return line and a flow control valve connects one of the supply line and the return line to the bypass line. A proportion of the expelled coolant to the bulk coolant forming the supply coolant is adjusted by the flow control valve.

According to a nineteenth aspect, the eighteenth aspect is provided, wherein the first flow control device controls a bypass flow of the bulk coolant returned to the supply circuit via the bypass line.

According to a twentieth aspect, the eighteenth aspect is provided, wherein the bypass line is in connection with the supply line upstream of the circulation line relative to the flow path in the supply line.

According to a twenty-first aspect, the eighteenth aspect is provided, wherein the flow control valve is a three-way valve in connection with the return line and the bypass line.

According to a twenty-second aspect, the twenty-first aspect is provided, wherein the three-way valve is further in connection with the supply circuit and controls a returned portion of the expelled coolant returned to the supply circuit.

According to a twenty-third aspect, the twenty-first aspect is provided, wherein the three-way valve controls a coolant mixture forming the supply coolant communicated through the supply line to the extruder, and the coolant mixture comprises the bulk coolant supplied from the supply circuit and the recirculated portion supplied from the expelled coolant through the circulation line.

According to a twenty-fourth aspect, the eighteenth aspect is provided, further comprising a pump in connection with one of the supply line and the return line.

According to a twenty-fifth aspect, the twenty-fourth aspect is provided, wherein the pump is configured to control a flow rate of the coolant communicated through the supply line and the return line.

According to a twenty-sixth aspect, the twenty-fifth aspect is provided, wherein the flow rate is constant and a supply temperature of the supply coolant is controlled via the flow control valve.

According to a twenty-seventh aspect, a temperature control method for an extrusion manufacturing system is disclosed. The method comprises receiving bulk coolant in a cooling circuit from a coolant supply, communicating supply coolant to an extruder, and receiving expelled coolant from the extruder. The method further comprises recirculating a recirculated portion of the expelled coolant and mixing the recirculated portion with the bulk coolant forming the supply coolant. A proportion of the expelled coolant is controlled relative to the bulk coolant forming the supply coolant by adjusting a volume of the recirculated portion. A supply temperature of the supply coolant is controlled based on the proportion of the recirculated portion of the expelled coolant to the bulk coolant.

According to a twenty-eighth aspect, the twenty-seventh aspect is provided, further comprising controlling a flow of the supply coolant at a constant flow rate.

According to a twenty-ninth aspect, the twenty-seventh aspect is provided, further comprising returning the expelled coolant to the coolant supply at a rate inversely proportional to the receipt of the bulk coolant.

According to a thirtieth aspect, the twenty-seventh aspect is provided, further comprising supplying the bulk coolant from the coolant supply to a plurality of cooling circuits at a common temperature and independently controlling a supply temperature of the supply coolant to each of the cooling circuits by controlling the proportion of the expelled coolant to the bulk coolant forming the supply coolant.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A cooling apparatus for an extrusion manufacturing system comprising a plurality of cooling circuits for at least one extruder, the apparatus comprising:
   a supply circuit in fluid connection with a coolant supply that distributes bulk coolant to the plurality of cooling circuits;
   each cooling circuit of the plurality of cooling circuits connected with the supply circuit via a first flow control device and comprising:
      an inlet that supplies the bulk coolant to a supply line, wherein the supply line delivers supply coolant to the at least one extruder;
      a return line that communicates expelled coolant from the at least one extruder; and
      a circulation line that connects the supply line to the return line, wherein the circulation line supplies a recirculated portion of the expelled coolant to the supply line and mixes the bulk coolant with the recirculated portion forming the supply coolant; and
   wherein the first flow control device is configured to control a proportion of the expelled coolant to the bulk coolant forming the supply coolant based at least in part on an extrusion temperature of the at least one extruder.

2. The cooling apparatus according to claim 1, further comprising:
   a temperature sensor in connection with at least one of the supply line or the return line and configured to detect a temperature of the at least one of the supply coolant or the expelled coolant, respectively; and
   a controller configured to control the proportion of the expelled coolant to the bulk coolant in response to the temperature of the at least one of the respective supply coolant or the expelled coolant.

3. The cooling apparatus according to claim 2, wherein the first flow control device is a valve and the controller is further configured to:
   control a pump to maintain a constant flow rate of the supply coolant through the supply line; and
   control the temperature of the at least one of the supply coolant or the expelled coolant by adjusting a position of the valve.

4. The cooling apparatus according to claim 3, wherein the at least one extruder comprises a barrel and at least one screw, and the plurality of cooling circuits comprises a barrel cooling circuit that cools the barrel and a screw cooling circuit that cools the at least one screw.

5. The cooling apparatus according to claim 4, wherein the controller is configured to:
   independently control the temperature of the supply coolant in the barrel cooling circuit and the screw cooling circuit by controlling the valves of the barrel cooling circuit and the screw cooling circuit.

6. The cooling apparatus according to claim 1, wherein each cooling circuit of the plurality of cooling circuits further comprises a second flow control device in connection with at least one of the supply line or the return line, and the second flow control device controls a flow rate of the supply coolant through the supply line.

7. The cooling apparatus according to claim 6, wherein the second flow control device is a pump.

8. The cooling apparatus according to claim 1, wherein the first flow control device controls a supply of the bulk coolant received by the supply line.

9. The cooling apparatus according to claim 1, wherein the supply circuit delivers the bulk coolant at a common temperature to each cooling circuit of the plurality of cooling circuits from the coolant supply.

10. A cooling apparatus for an extruder for extruding structures from a ceramic-forming mixture, the cooling apparatus comprising:
   a supply line configured to receive bulk coolant from a supply circuit via an inlet, wherein the supply line delivers a supply coolant to the extruder along a flow path in the supply line;
   a return line that communicates expelled coolant from the extruder;
   a circulation line that connects the supply line to the return line, wherein the circulation line supplies a recirculated portion of the expelled coolant to the supply line and mixes the bulk coolant with the recirculated portion of the expelled coolant forming the supply coolant;

a bypass line connecting the supply line to the return line; and a flow control valve connecting one of the supply line or the return line to the bypass line, wherein a proportion of the expelled coolant to the bulk coolant forming the supply coolant is adjusted by the flow control valve.

11. The cooling apparatus according to claim 10, wherein the flow control valve controls a bypass flow of the bulk coolant returned to the supply circuit via the bypass line.

12. The cooling apparatus according to claim 10, wherein the bypass line is in connection with the supply line upstream of the circulation line relative to the flow path.

13. The cooling apparatus according to claim 10, wherein the flow control valve is a three-way valve in connection with the return line and the bypass line.

14. The cooling apparatus according to claim 13, wherein the three-way valve is further in connection with the supply line and controls the recirculated portion of the expelled coolant returned to the supply line.

15. The cooling apparatus according to claim 13, wherein the three-way valve controls a coolant mixture forming the supply coolant communicated through the supply line to the extruder, the coolant mixture comprising the bulk coolant supplied from the supply circuit and the recirculated portion supplied from the expelled coolant through the circulation line.

16. The cooling apparatus according to claim 10, further comprising a pump in connection with one of the supply line or the return line, wherein the pump is configured to control a flow rate of the coolant communicated through the supply line and the return line, and wherein the flow rate is constant and a supply temperature of the supply coolant is controlled via the flow control valve.

17. A temperature control method for an extrusion manufacturing system, the method comprising:

receiving bulk coolant in a cooling circuit from a coolant supply;

communicating supply coolant to an extruder;

receiving expelled coolant from the extruder;

recirculating a recirculated portion of the expelled coolant and mixing the recirculated portion with the bulk coolant forming the supply coolant;

controlling a proportion of the expelled coolant to the bulk coolant forming the supply coolant by adjusting a volume of the recirculated portion; and controlling a supply temperature of the supply coolant based on the proportion of the recirculated portion of the expelled coolant to the bulk coolant.

18. The temperature control method according to claim 17, further comprising one or more of:

controlling a flow of the supply coolant at a constant flow rate; or returning the expelled coolant to the coolant supply at a rate inversely proportional to the receipt of the bulk coolant.

19. The temperature control method according to claim 17, further comprising:

supplying the bulk coolant from the coolant supply to a plurality of cooling circuits at a common temperature; and independently controlling a supply temperature of the supply coolant to each of the cooling circuits by controlling the proportion of the expelled coolant to the bulk coolant forming the supply coolant.

20. The temperature control method according to claim 17, wherein controlling the supply temperature of the supply coolant achieves a change in a steady state of the supply temperature of 2° C. for the supply coolant in a time of less than 15 minutes.

* * * * *